United States Patent [19]

Takahashi et al.

[11] Patent Number: 4,846,521
[45] Date of Patent: Jul. 11, 1989

[54] FOOT COVER FOR BABY BUGGY

[75] Inventors: Takehiko Takahashi; Hitoshi Katou; Tomihiro Kaneko, all of Tokyo, Japan

[73] Assignee: Combi Co., Ltd., Tokyo, Japan

[21] Appl. No.: 221,381

[22] Filed: Jul. 19, 1988

[30] Foreign Application Priority Data

Oct. 9, 1987 [JP] Japan .............................. 62-155424[U]

[51] Int. Cl.$^4$ ............................ B60J 1/04; B60N 3/06
[52] U.S. Cl. ..................................... 296/77.1; 296/75; 296/81; 280/47.4; 280/643; 297/429; 297/438
[58] Field of Search .................... 296/77, 77.1, 81, 82, 296/75, 83; 280/47.38, 47.39, 47.4, 643; 297/429, 433, 438; 5/416

[56] References Cited

U.S. PATENT DOCUMENTS 2,663,589 12/1953 Welsh .............................. 280/47.4 X
2,693,366 11/1954 Randolph ....................... 280/47.4 X
4,678,222 7/1987 Kassai ................................. 296/77.1

Primary Examiner—Dennis H. Pedder
Attorney, Agent, or Firm—Sughrue, Mion, Zinn, Macpeak and Seas

[57] ABSTRACT

A foot cover for a baby buggy capable of positively protecting the feet and legs of a baby place in a reclining position from the wind. A front cover is attached to a lower plate portion. A core wire runs along the periphery of the front cover. Ends of the core wire are pivotally connected to foot cover holders placed around the front legs of the buggy. The foot cover holders have integral grippers into which side portions of the core wire are fit to hold the foot cover in its raised position.

3 Claims, 4 Drawing Sheets

FOOT COVER FOR BABY BUGGY

BACKGROUND OF THE INVENTION

The present invention relates to a baby buggy having a rear portion which can be inclined to place the baby in a reclining position. More specifically, the invention relates to a foot cover for such a baby buggy used to protect the feet and legs of the baby from exposure to cold winds and the like especially when the baby is lying in the reclined position, the foot cover being removably attachable to the front of a seat floor portion of the buggy.

A wide variety of baby buggy designs are known in the art. Many conventional baby buggies have the capability of freely changing the angle of a back portion between a sitting position and a reclining position. Also, many designs for the push bar structure are known. For example, in some cases, the push bar is connected to the rear of the buggy, while in others it is fixed to the buggy at a position confronting the baby.

Nearly all recent improvements to baby buggy design have concerned the portion of the buggy on which the baby rests, including, for instance, the mechanism used to recline the back portion of the buggy. Little attention or interest has been paid to protecting the baby's feet and legs when the baby is placed in the reclining position. In most current baby buggy designs, the baby's feet or legs protrude forward of or hang down from the seat portion without protection. Moreover, in conventional baby buggy designs, there is little or no protection from cold air flowing around the front portion of the buggy for the baby when in the sitting position.

In order to protect the baby from cold winds, it has been proposed to cover the front portion of the buggy with a cover similar to the lower half portion of a sleeping bag to wrap up the lower half of the baby. However, such an arrangement is inconvenient to use in that it restricts movement of the baby's legs and lower portion of the torso. Moreover, except in the coldest weather, the baby is often too warm and thus uncomfortable.

SUMMARY OF THE INVENTION

Accordingly, it is an object of the present invention to provide a baby buggy in which the problems noted above have been eliminated.

In accordance with this and other objects, the invention provides a foot cover for a baby buggy which encloses the front face of the seat floor portion of the buggy and which is removably attachable to the main body of the buggy, specifically, to the front leg rods. The inventive foot cover, which can easily be attached to and removed from the buggy, provides excellent protection for the feet and legs of a baby placed in the reclining position from the cold and the wind.

More specifically, according to the present invention there is provided a foot cover removably attachable to the front portion of the main body of a baby buggy having a generally rectangular bottom plate and a front wall portion having a "C" shape in cross section extending upward from the bottom plate for a predetermined height. The foot cover is attached to the front portion of the main body of the buggy at the front leg rods by a pair of foot cover holders. The front wall portion is held in place when in use by a pair of grippers formed on the foot cover holders which receive a shape-retaining core wire running around the edge of the front wall portion.

DESCRIPTION OF THE PREFERRED EMBODIMENTS

Referring to FIGS. 1 to 5 of the attached drawings, preferred embodiments of the present invention will now be described.

Figure 1:
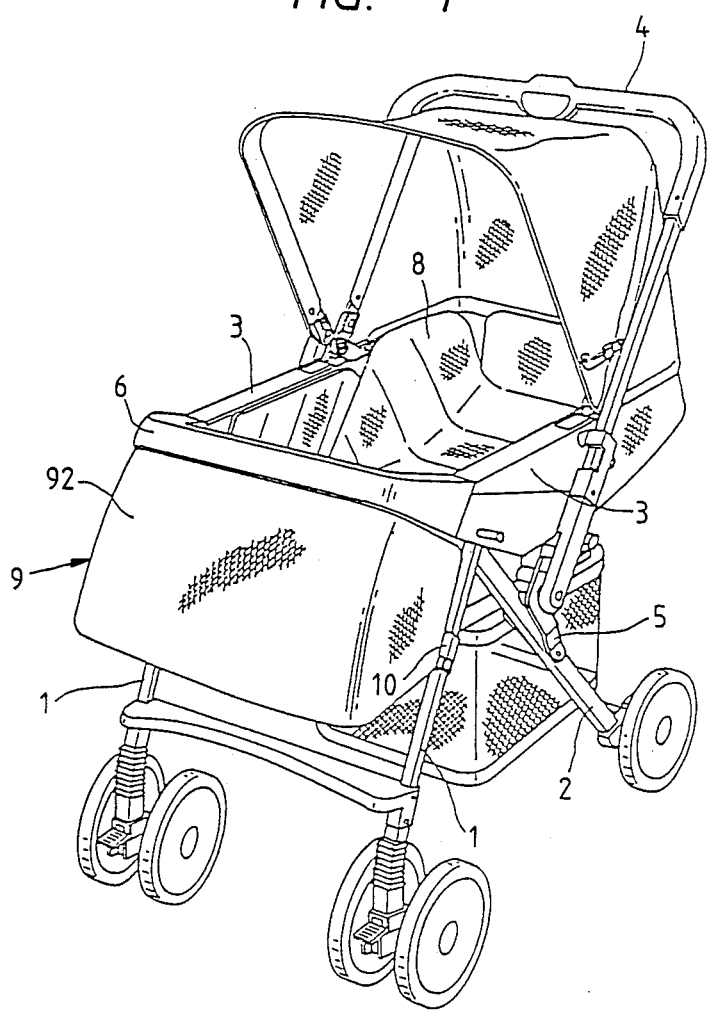
FIG. 1 shows a perspective view of a baby buggy employing a front foot cover constructed in accordance with the invention when in its raised (in-use) position.
Figure 2:
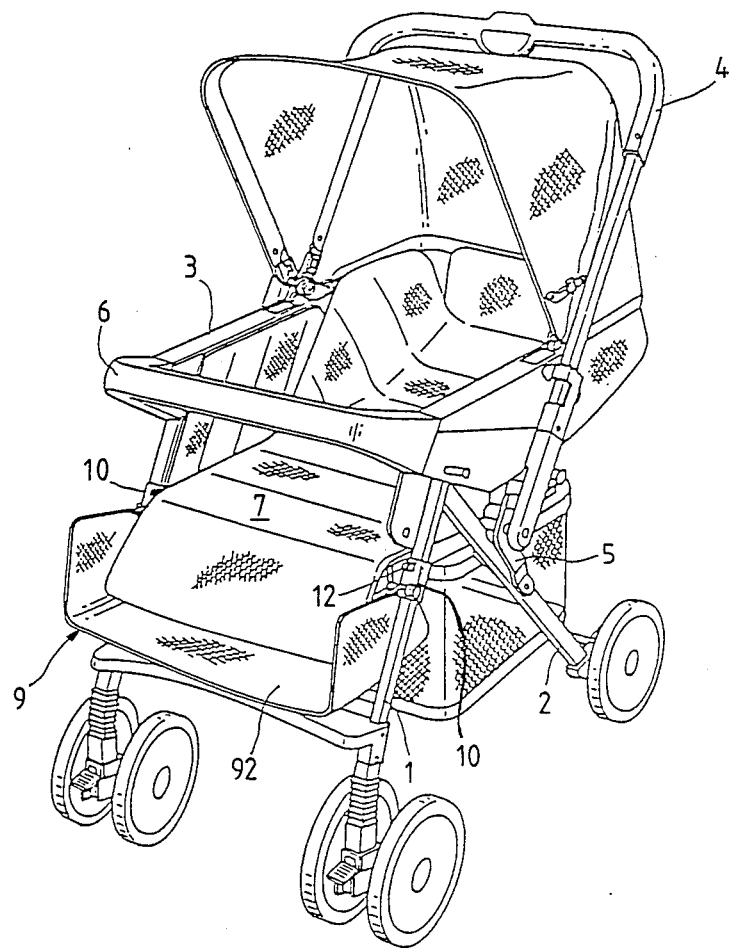
FIG. 2 is a view similar to FIG. 1 but showing the front foot cover in its lowered (out-of-use) position.
Figure 3:
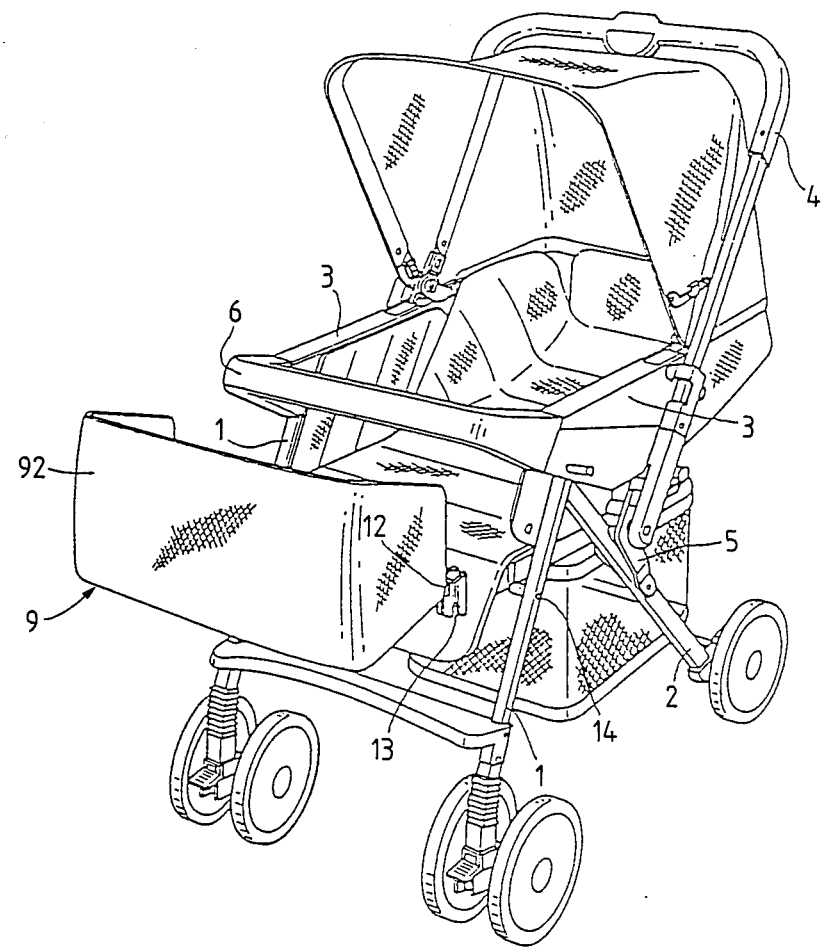
FIG. 3 is a perspective view showing the foot cover in a dismantled state.

Referring first to FIGS. 1 and 2 of the drawings, reference numeral 1 indicates a pair of front leg rods, and reference numeral 2 a pair of rear leg rods. The upper ends of the rods 1 and 2 are pivotally secured to front end portions of elbow rest rods 3 by means of pivot shafts.

Reference numeral 4 denotes a "U"-shaped push bar pivotally secured to middle portions of the rear leg rods 2 via a pair of "L"-shaped folding operating rods 5. The lower portions of the folding operating rods 5 extend parallel to the rear leg rods 2 and are pivotally secured to the rear leg rods 2. The lower portions of the push bar 4 are secured to the upper portions of the respective folding operating rods 5, which are shaped to abut against the rear surfaces of the rear leg rods 2 when the buggy is in use. When the buggy is folded for storage, the pivotal connection between the lower portions of the folding operating rods 5 and the rear leg rods 2 act as fulcrums.

Reference numeral 6 indicates a "C"-shaped guard provided to prevent the baby from falling out of the buggy. The guard 6 is removably attached to end portions of a pair of opposing elbow rest rods 3 via fitting protrusions or the like (not shown) which fit into corresponding holes formed in the elbow rest rods 3. When attached, the guard 6 fits integrally with the elbow rest rods 3.

A seat floor plate 7 has a movable back portion 8 which can be moved between a reclining position and a sitting position with a known reclining mechanism.

Reference numeral 9 designates a foot cover, which is the primary concern of the present invention. The foot cover 9 includes a generally rectangularly shaped plate 91, which has a width substantially the same as that of the seat floor plate 7, and a front wall 92 having a "C" shape in cross section. A core wire 93 is provided for retaining the shape of the front wall 92. The core wire 93 is inserted through a peripheral portion of material of the front wall 92.

Although the height of the front wall 92 is not particularly restricted, it is preferred that the height be such that the upper edge of the front wall 92 fit below the front guard 6 when the foot cover is in its raised (in-use) position.

Figure 4:
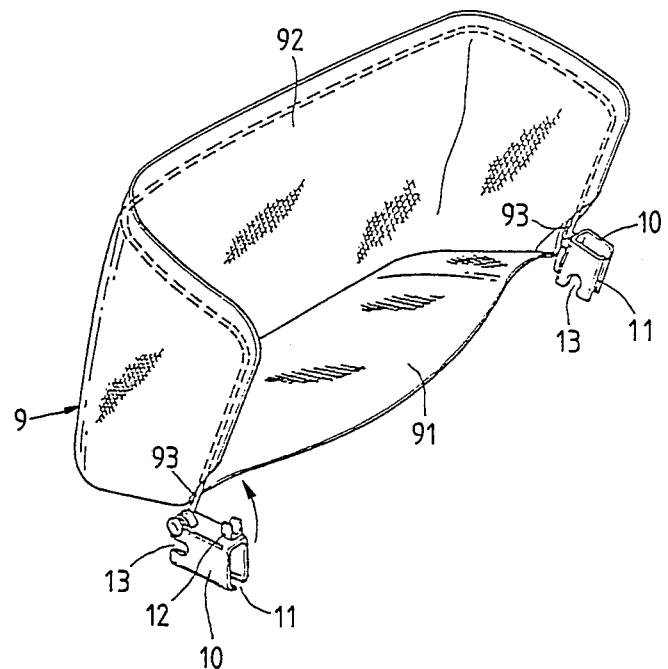
FIG. 4 is a perspective view showing only the foot cover.
Figure 5:
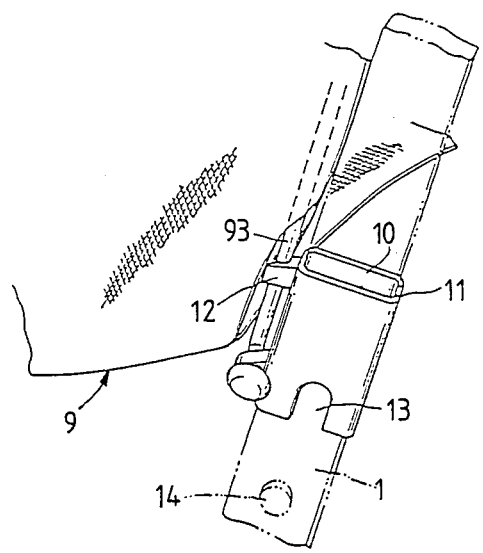
FIG. 5 is an enlarged perspective view showing a holder for the front foot cover.

A pair of foot cover holders 10 are attached to the front faces of the front leg rods 1 for pivotally mounting the foot cover 9 to the front leg rods 2 and for retaining the foot cover in its raised position. With reference now to FIGS. 4 and 5, the foot cover holders 10, which are formed of an elastic plastic material and are generally "C" shaped in cross section, have a body portion 11 conforming to the shape of the front leg rods 1 around which the holders 10 are fit. End portions of the wire 93 are pivotally connected to respective ones of the holders 10.

Grippers 12 are formed on the front faces of the holders for elastically engaging and retaining the wire 93 to hold the foot cover 9 in the raised position. "U"-shaped cut-outs are formed in the sides of the holders 10 into which are received engagement pins 14 fixed to the sides of the front leg rods 1 to thereby set the positions of the holders 10 along the front leg rods 1. The engagement pins 14 may have an enlarged head (not shown) if desired.

Although the front leg rods 1 and the body portion 11 of the holders 10 are shown as being square or rectangular in the drawings, other shapes may be used if desired.

Additionally, the above-described embodiment may be modified by providing a sliding support extending from beneath the seat floor portion of the buggy to add further support to the foot cover.

The foot cover constructed as described above is used in the following manner.

(1) Attachment to Front Leg Rods

In order to fit the foot cover 9 onto the front leg rods 1, the holders 10 are press-fitted onto the respective front leg rods 1 above the engagement pins 14 so that the body portions 11 fit snugly around the front leg rods 1. The holders 10 are then slid downward until the engagement pins 14 are received in the cut-outs 13.

(2) To Use Foot Cover

To place the foot cover 9 in use, the front wall 92 is raised and the core wire 93 at its two sides inserted into the grippers 12 formed on the respective holders 10. The foot cover 9 is thus firmly held in its raised position by the two pivot connections of the lower ends of the wire 93 and by the grippers 12.

If a sliding support is provided, it is extended when the foot cover is in use.

(3) To Place Foot Cover Out of Use

When the foot cover is not to be used, the sides of the core wire 93 are pulled out of the grippers 12 and the front wall 91 rotated around the pivotal connections of the core wire 93 to thereby lower the front wall 91. As shown in FIG. 2, in the lowered position, the foot cover 9 does not hinder the ordinary use of the buggy.

(4) To Remove Foot Cover

To remove the foot cover 9, the procedure described under (1) is reversed. That is, the holders 10 are slid upward to disengage the cut-outs 13 and pins 14. The holders 10 are then elastically pulled sideward and then forward to remove them from the front leg rods 1.

With the foot cover constructed as described above, the above-mentioned problems of the prior art are completely overcome. That is, when the baby is placed in the reclining position inside the buggy and the foot cover raised, the baby's feet and legs are completely protected from the wind. Moreover, the inventive foot cover, by blocking the entry of wind at the front of the buggy, also protects the baby's entire body.

The foot cover of the invention can easily be attached to and removed from the baby buggy with a very simple operation, and the foot cover raised and lowered easily, making the buggy very easy to use.

What is claimed is:

1. A foot cover for a baby buggy, comprising: a generally rectangular plate with two longitudinal sides and two lateral sides, a front wall having generally a "C" shape in cross section, said plate attached along one of said longitudinal sides and said two lateral sides to said front wall; a core wire extending around peripheral portions of said front wall other than along said plate; and a pair of foot cover holders attachable to front leg rods of said buggy, end portions of said core wire being pivotally connected to respective ones of said holders, a gripper being formed on each of said holders for elastically gripping said core wire above the pivotal connections between said end portions of said core wire and said holders.

2. The foot cover for a baby buggy of claim 1, wherein said foot cover holders are formed of an elastic material and have generally "C"-shaped body portions shaped to fit snugly around said front leg rods.

3. The foot cover for a baby buggy of claim 1, wherein said foot cover holders have formed therein cut-outs for receiving engagement pins fixed to said front leg rods.

* * * * *